US012433802B2

United States Patent
Corneliusson et al.

(10) Patent No.: US 12,433,802 B2
(45) Date of Patent: Oct. 7, 2025

(54) WASHABLE OUTER SHELL WITH HOOK COVER MEMBER

(71) Applicant: Essity Hygiene and Health Aktiebolag, Gothenburg (SE)

(72) Inventors: Helena Corneliusson, Gothenburg (SE); Mattias Johansson, Gothenburg (SE); Ulla Danielsson, Gothenburg (SE); Karoline Lenhult, Lidköping (SE)

(73) Assignee: Essity Hygiene and Health Aktiebolag, Gothenburg (SE)

( * ) Notice: Subject to any disclaimer, the term of this patent is extended or adjusted under 35 U.S.C. 154(b) by 276 days.

(21) Appl. No.: 18/264,082

(22) PCT Filed: Feb. 26, 2021

(86) PCT No.: PCT/EP2021/054851
§ 371 (c)(1),
(2) Date: Aug. 3, 2023

(87) PCT Pub. No.: WO2022/179700
PCT Pub. Date: Sep. 1, 2022

(65) Prior Publication Data
US 2024/0115431 A1 Apr. 11, 2024

(51) Int. Cl.
*A61F 13/49* (2006.01)
*A61F 13/505* (2006.01)
(Continued)

(52) U.S. Cl.
CPC .......... *A61F 13/505* (2013.01); *A61F 13/625* (2013.01); *A61F 13/627* (2013.01); *A61F 2013/15276* (2013.01)

(58) Field of Classification Search
CPC .......... A61F 13/15268; A61F 13/49003; A61F 13/49004; A61F 13/505; A61F 13/633;
(Continued)

(56) References Cited

U.S. PATENT DOCUMENTS

| 4,568,342 A * | 2/1986 | Davis ................ A61F 13/49004 D24/126 |
| 4,680,030 A | 7/1987 | Coates et al. |

(Continued)

FOREIGN PATENT DOCUMENTS

| GB | 2238462 A | 6/1991 |
| GB | 2248379 A | 4/1992 |

(Continued)

OTHER PUBLICATIONS

International Search Report (PCT/ISA/210) and Written Opinion (PCT/ISA/237) mailed on Nov. 29, 2021, by the European Patent Office as the International Searching Authority for International Application No. PCT/EP2021/054851.
(Continued)

*Primary Examiner* — Catharine L Anderson
(74) *Attorney, Agent, or Firm* — Buchanan Ingersoll & Rooney PC

(57) ABSTRACT

The present disclosure relates to a washable outer shell (1) for an absorbent assembly (2), the outer shell (1) including an inner surface (3) and an outer surface (4), the outer shell (1) has an extension in the longitudinal direction (L) and in the transverse direction (T), the outer shell (1) comprises a front region (5), a crotch region (6) and a rear region (7), the rear region (7) including a first and a second corner region (7a,7b) and a rear central region (7c), the outer shell (1) including a first hook member (9a) provided in the first corner region (7a) and a second hook member (9b) provided in the second corner region (7b), the first corner region (7a)
(Continued)

including a first corner outer edge (7a') and the second corner region (7b) including a second corner outer edge (7b'), the outer shell (1) including a hook attachment zone (8).

12 Claims, 3 Drawing Sheets

(51) Int. Cl.
    *A61F 13/62*     (2006.01)
    *A61F 13/15*     (2006.01)

(58) Field of Classification Search
    CPC ...... A61F 13/625; A61F 13/627; A61F 13/66; A61F 13/68; A61F 13/74; A61F 13/76; A61F 2013/15276; A61F 2013/5683
    See application file for complete search history.

(56) References Cited

U.S. PATENT DOCUMENTS

| | | | |
|---|---|---|---|
| 9,592,165 B2 * | 3/2017 | Labit | ............... A61F 13/505 |
| 2010/0318057 A1 | 12/2010 | Yakem | |
| 2012/0022491 A1 | 1/2012 | Roe | |
| 2012/0022492 A1 | 1/2012 | Roe | |
| 2012/0316535 A1 | 12/2012 | Miyake et al. | |

FOREIGN PATENT DOCUMENTS

| | | |
|---|---|---|
| JP | S49128429 U | 11/1974 |
| JP | 2000296152 A | 10/2000 |
| JP | 2011235076 A | 11/2011 |
| JP | 2013532518 A | 8/2013 |
| JP | 2016096883 A | 5/2016 |

OTHER PUBLICATIONS

International Preliminary Report on Patentability and Written Opinion of the International Searching Authority (Forms PCT/IB/326, PCT/IB/373 and PCT/ISA/237) issued on Sep. 7, 2023, by the International Bureau of WIPO, in corresponding International Application No. PCT/EP2021/054851. (7 pages).

Office Action issued on Oct. 28, 2024, by the Japanese Patent Office in corresponding Japanese Patent Application No. 2023-551775, and an English Translation of the Office Action. (8 pages).

* cited by examiner

WASHABLE OUTER SHELL WITH HOOK COVER MEMBER

TECHNICAL FIELD

The present disclosure pertains to a washable outer shell for an absorbent assembly. In particular, this disclosure pertains to a washable outer shell comprising a first and a second hook member arranged in a respective first and second corner region in the washable outer shell rear region.

BACKGROUND OF THE INVENTION

The present disclosure generally relates to the field of reusable and washable diapers, and more particularly to a washable outer shell adapted for receiving an absorbent assembly, either a reusable absorbent assembly or a disposable absorbent assembly.

For economic and environmental reasons, parts of the absorbent article or the whole absorbent article may be washable and reusable. The absorbent article may for example include a washable outer shell which is intended to receive an absorbent assembly which may be removably attached to the outer shell. The washable outer shell may be reused after soiling and removal of the absorbent assembly by attaching a new absorbent assembly to the outer shell. The outer shell may during use be soiled and may be washed between uses. Washing of the outer shell may lead to impaired functionality of hook material provided on the washable outer shell and undesired attachment of hook materials to other parts of the outer shell or to other items during washing, which may have negative impact on the cleaning of the outer shell and may damage fragile textile materials washed together with the washable outer shell.

There is thus still a need for a washable outer shell which has a prolonged life span, which outer shell is easy and convenient to wash and which has an improved washing result.

SUMMARY OF THE INVENTION

One or more of the above objects may be achieved with a washable outer shell in accordance with claim 1. Further embodiments are set out in the dependent claims and in the following description.

A washable outer shell for an absorbent assembly according to the present disclosure comprises an inner surface and an outer surface opposite to the inner surface. The washable outer shell has an extension in the longitudinal direction and in the transverse direction. The outer shell comprises a front region, a crotch region and a rear region. The rear region comprises a first and a second corner region and a rear central region arranged between the first and the second corner regions, as seen in the transverse direction. The outer shell comprises a first hook member provided in the first corner region on the inner surface of the outer shell and a second hook member provided in the second corner region on the inner surface of the outer shell. The first corner region comprises a first corner outer edge and the second corner region comprises a second corner outer edge. The outer shell comprises a hook attachment zone on the outer surface in the front region of the outer shell and the first and second hook members are adapted to be attached to the hook attachment zone to form a waist opening. Each of the first corner region and the second corner region is provided with a respective first and second hook cover member and each hook cover member has a first mode in which the respective hook cover member is arranged to expose the respective first and second hook member and a second mode covering the respective hook member. Each of the first and the second hook cover member is arranged on the outer surface of the outer shell when in the first mode and each of the first and the second hook cover member is folded over the respective first and a second corner outer edge and arranged on the inner surface of the outer shell when in the second mode.

The washable outer shell is an outer shell that is capable of being washed without essential shrinkage or other damage, such as after five and up to forty washing occasions. The outer shell is made from a washable material such as a washable fabric. The outer shell may be made of one or more of the following materials: polyester, viscose, polyamide and/or cotton. The outer shell may be a stretchable outer shell, i.e., being made of a stretchable material. The outer shell may be an elastic shell, being elastic in the longitudinal and/or the transverse direction of the outer shell.

The outer surface of the outer shell is intended to face away from the user during use and/or the inner surface of the outer shell is adapted to face the user or the absorbent assembly during use. The first and second hook members are arranged on the inner surface of the outer shell but faces the hook attachment zone during use of the washable outer shell.

The washable outer shell may after use be washed, such as machine washed, and reused. Washing of the outer shell may however lead to impaired functionality of the first and second hook members. During washing of the washable outer shell, threads and other material debris may get caught into the hook material and thereby deteriorate the ability of the hook member to attach to the hook attachment zone. A further issue with the first and second hook members during washing of the washable outer shell is undesired attachment of the hook materials to other parts of the outer shell or to other items during washing, which may have negative impact on the cleaning of the washable outer shell since it may prevent access of the water and the detergent to certain parts of the outer shell and prevent proper cleaning of certain parts of the washable outer shell. Attachment of the hook materials to other items during washing may also damage fragile textile materials washed together with the washable outer shell.

In a washable outer shell according to the present disclosure, the first and second rear corner regions of the washable outer shell are provided with a respective first and second hook cover member arranged on the outer surface of the outer shell when in the first mode. The washable outer shell is provided to the user with first and second hook cover member being in the first mode, i.e., not covering the first and second hook members. After use and soiling of the washable outer shell, the first and second hook cover member may, prior to washing, easily be provided in the second mode by folding the first and second hook cover member over the respective first and a second corner outer edge. The first and second hook cover members thereby efficiently cover and protect the first and second hook members on the inner surface of the outer shell. Since the hook cover members are arranged on the outer surface of the washable outer shell in the first mode, there is no undesired interaction between the hook members and the hook covering members during attachment of the hook members to the hook attachment zone and during use of the article. The hook cover members are also readily visibly to the user or to the caretaker, thus facilitating identification of the hook cover members. Since the hook cover members are provided on the outer surface of the washable outer shell the risk of the hook cover member being soiled during use also decreases significantly, which improves the hygiene during handling of the hook cover members.

Each of the first and second hook member may be arranged 15 mm or less from the respective first and second corner outer edge. This enables an easy fold over of hook cover members and a reduced size of the hook cover members. The hook cover members may extend from the first and second corner outer edge. The first and second hook cover member may be connected to the outer shell at the first and second corner outer edge or may be made of a part of the outer shell being folded back over the outer shell in the respective first and second corner regions.

The first and the second hook cover member may be a respective first and second pocket arranged on the outer surface of the outer shell when in the first mode and are adapted to be folded over to the inner surface of the outer shell at the respective first and a second corner outer edge. When being in the first mode, the first and the second hook cover members may thus be discreetly arranged on the outer surface of the outer shell with no loose parts sticking out from the outer shell which may get stuck or interfere with the attachment of the first and second hooks to the hook attachment zone on the outer surface in the front region of the outer shell. Folding of the first and second pockets from the first mode and over the respective first and second corned edge to the second mode after use and prior to washing of the outer shell is an easy and self-instructing way to cover the first and second hook members during washing of the outer shell. The protection of the first and second hook members from having threads and debris from sticking to the hook material is thereby improved and the life span of the hook members increase. The first and second hook cover member being a first and second pocket according to the present disclosure furthermore reduces the risk of that the first and second hook members attaches to other parts of the washable outer shell or to other items in the washing machine during washing.

The first pocket may be attached along the first corner outer edge of the outer shell and the second pocket may be attached along the second corner outer edge of the outer shell. This facilitates the folding of the first and second pockets over the respective corner outer edges and allows reduction in size of the respective pocket.

A surface area of the first hook cover member may be at least 20% larger than a surface area of the first hook member and a surface area of the second hook cover member may be at least 20% larger than a surface area of the second hook member.

A surface area of the first hook cover member may be at least 35% larger than a surface area of the first hook member and a surface area of the second hook cover member may be at least 35% larger than a surface area of the second hook member.

A surface area of the first hook cover member may be within the range of from 45% to 100% larger than a surface area of the first hook member and a surface area of the second hook cover member may within the range of from 45% to 100% larger than a surface area of the second hook member.

The first and second hook cover member may be made of the same material as the outer shell. The outer shell may be made of one or more of the following materials; polyester, viscose, polyamide and/or cotton. This implies that the hook cover members have a lower adhesion to the hook members and thus are easy to cover and uncover without getting caught in the hook members.

The first and second hook cover members may be integrated parts of the outer shell.

The first and second hook cover members may be separate parts connected to the outer shell.

The first and second hook cover member may each be provided with an elastic member.

This may enhance the protection and coverage of the hook members during washing of the outer shell. The elastic member may be arranged at, and in parallel with, a respective free edge of the first and second hook cover member.

The first and second hook members may each have a rectangular shape, or a trapezoid shape, with rounded corner portions. The rounded corner portions may decrease the risk of edges of the hook member sticking out from the respective first and second hook cover members when being provided in the second mode.

The washable outer shell may comprise a front hook member arranged on the inner surface in the front region of the outer shell. The washable outer shell may comprise a rear hook member arranged on the inner surface in the rear region of the outer shell. The front hook member and the rear hook member are arranged to face and be detachably attached to a backsheet or to a respective look area arranged on the backsheet of the absorbent assembly.

The outer shell may comprise a front pocket arranged in the front region of the outer shell on the inner surface of the outer shell and a rear pocket may be arranged on the inner surface of the outer shell in the rear region of the outer shell, the front and rear pockets being adapted to receive a front section and a rear section of the absorbent assembly to hold the absorbent assembly in the outer shell. The rear pocket may extend over the first and second corner regions and the rear central region or only the rear central region. When the rear pocket extends over the first and second corner regions, the inner surface of the outer shell is the outer surface of the rear pocket.

The washable outer shell may comprise a front hook member in the front pocket. The washable outer shell may comprise a rear hook member arranged in the rear pocket. The front hook member and the rear hook member are arranged to face and be detachably attached to a backsheet or to a respective look area arranged on the backsheet of the absorbent assembly.

The absorbent assembly may alternatively be an integrated part of the washable outer shell. The absorbent assembly may be a washable absorbent assembly.

BRIEF DESCRIPTION OF THE DRAWINGS

The present invention will be further explained hereinafter by means of non-limiting examples and with reference to the appended drawings wherein.

DETAILED DESCRIPTION

Figure 1A:
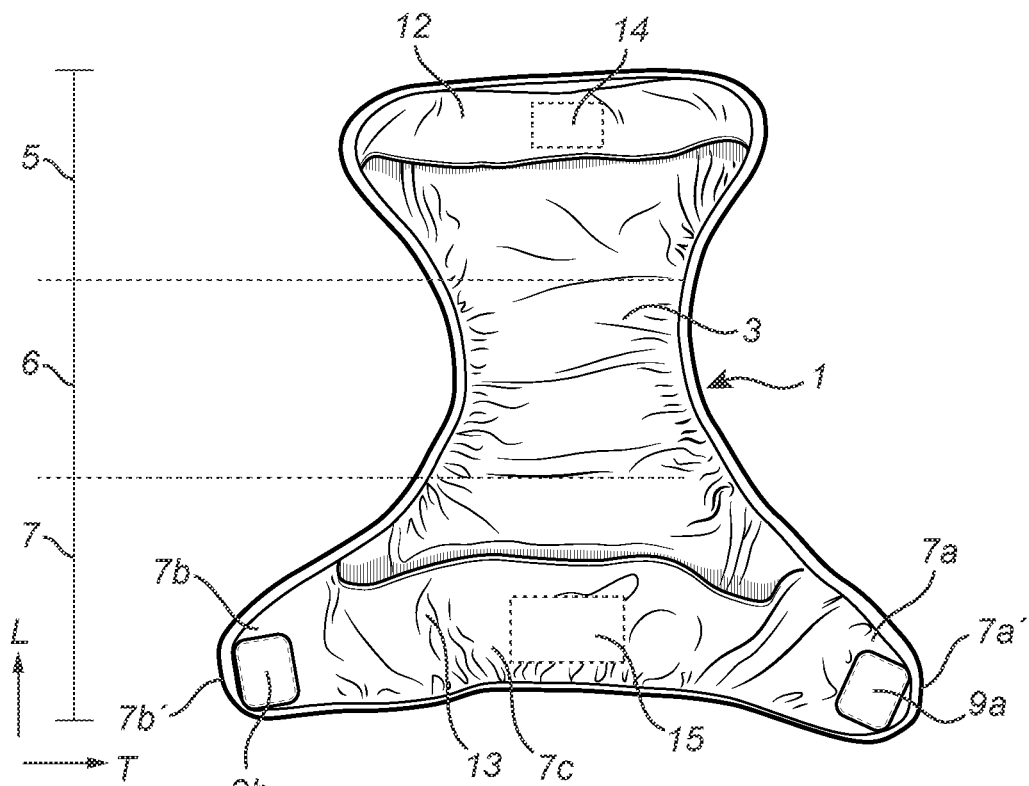
FIG. 1A illustrates a washable outer shell according to the present disclosure, as seen from the inner surface.

The invention will be described more closely below by reference to an exemplary embodiment. The invention may however be embodied in many different forms and should not be construed as limited to the embodiments set forth in the drawings and the description thereto.

Figure 1B:
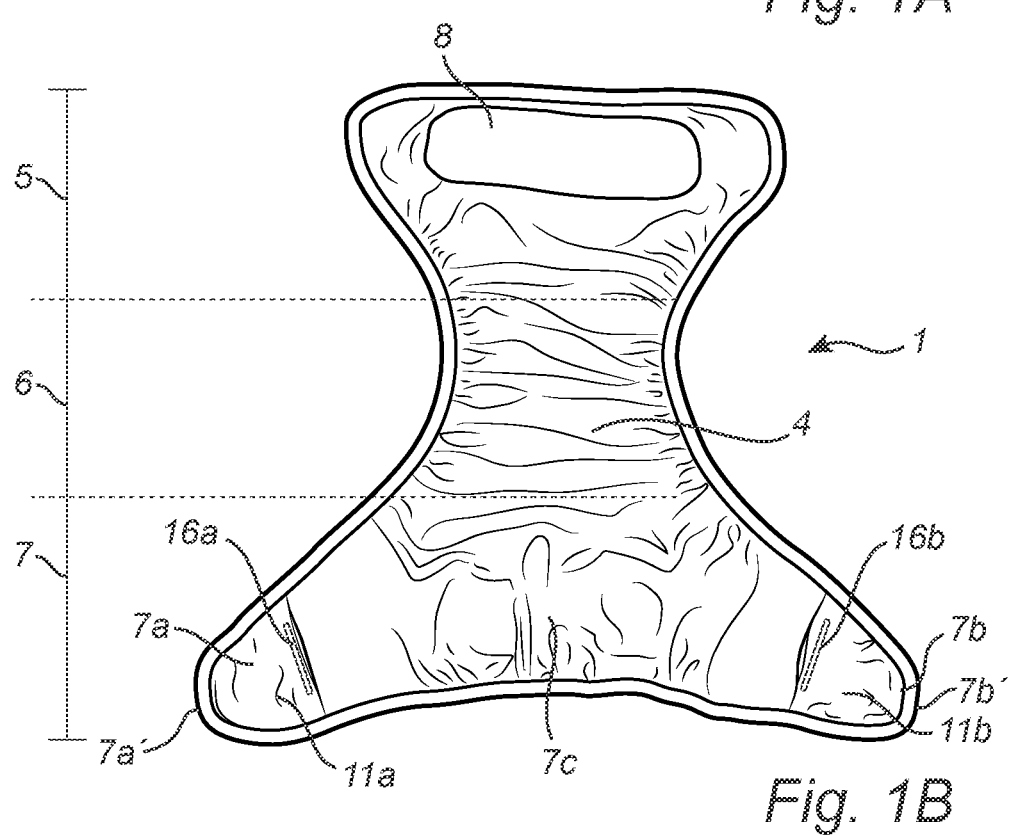
FIG. 1B illustrates the washable outer shell in FIG. 1A, as seen from the outer surface.

FIGS. 1A and 1B show a washable outer shell 1 according to the present disclosure. The outer shell 1 comprises an inner surface 3 and an outer surface 4 and has an extension in the longitudinal direction L and in the transverse direction T. FIG. 1A is an illustration of the washable cover 1 as seen from the inner surface 3 and FIG. 1B shows the outer shell 1 as seen from the outer surface 4. The outer shell 1 shown in FIGS. 1A and 1B is adapted to receive an absorbent assembly 2 (see FIG. 3). The outer shell 1 comprises a front region 5, a crotch region 6 and a rear region 7. The rear region 7 comprises a first corner region 7a and a second corner region 7b and a rear central region 7c arranged between the first and second corner regions 7a,7b, as seen in the transverse direction T. The outer shell 1 comprises a first hook member 9a provided in the first corner region 7a and a second hook member 9b provided in the second corner region 7b. The first and the second hook members 9a,9b are intended to be arranged to face the outer surface 4 of the outer shell 1 during use and to be attached to a hook attachment zone 8 provided on the outer surface 4 in the front region 5 of the outer shell 1 to form a waist opening.

The first and second hook members 9a,9b may comprise any hook-type material with a hook surface structure and the hook attachment zone 8 may comprise any loop surface structure, and the terms hook members are to be interpreted as encompassing the hook part of a hook and loop fastening system, e.g., known as a VELCRO® system. The "hooks" may have many different shapes which are adapted to engage with a loop part of the hook and loop fastening system. The hooks may, purely as an example, by of a J-shape, mushroom shape, and palm tree shape. The hook attachment zone may comprise any type of loop surface structure, which is here to be understood to encompass a surface structure to which a hook material of a hook and loop fastening system is attachable.

Accordingly, a loop surface structure may include fibers or threads extending from a surface and back into the surface to define genuine loops, as well as a surface structure including fibers or threads extending out from a surface and baying loose ends, which fibers or threads entangle with each other. Upon attachment of the respective hook members, the hook surface structure engages with the loop surface structure providing a releasable attachment between the elements.

Figure 3:
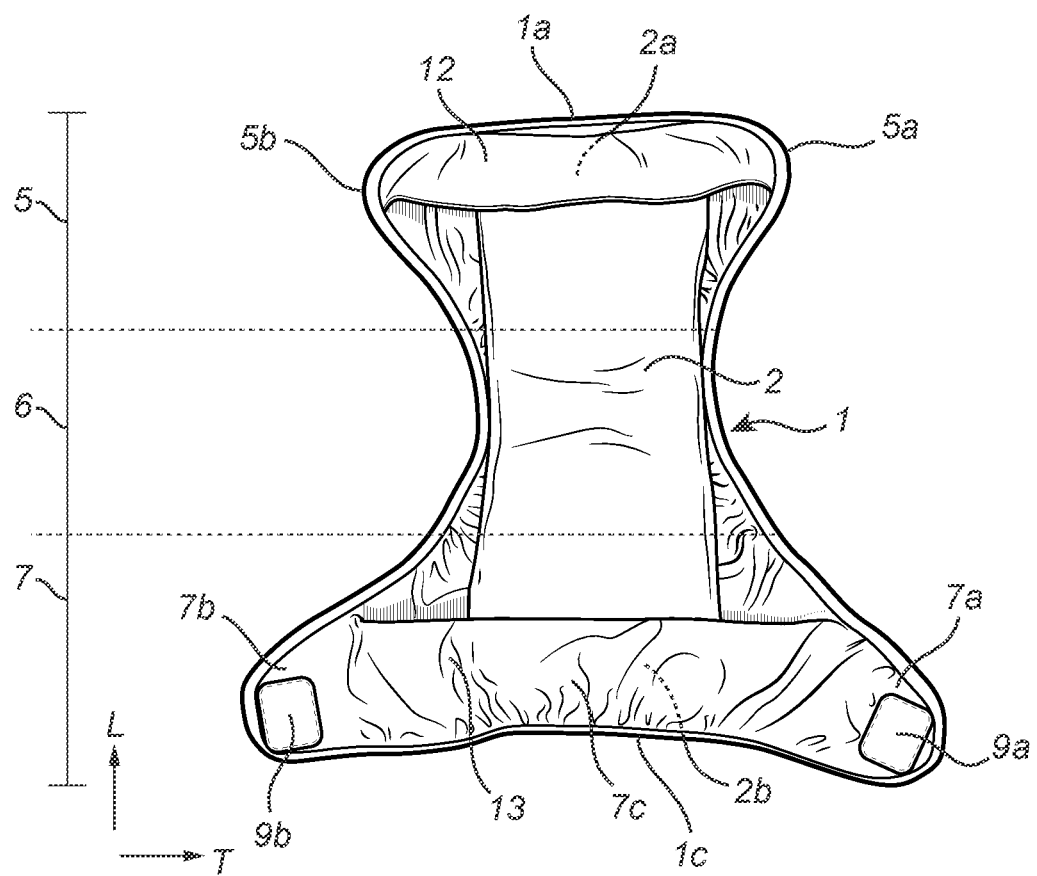
FIG. 3 illustrates a washable outer shell according to the present disclosure, provided with an absorbent assembly.

The outer shell 1 comprises a front pocket 12 arranged in the front region 5 of the outer shell 1 on the inner surface 3 thereof and a rear pocket 13 arranged on the inner surface 3 of the outer shell in the rear region thereof. The front pocket 12 is adapted to receive a front section 2a of the absorbent assembly 2 and the rear pocket 13 is adapted to receive a rear section 2b of the absorbent assembly 2 (as illustrated in FIG. 3).

To releasably attach the absorbent assembly 2 to the outer shell 1, the outer shell 1 comprises a front hook member 14 arranged in the front pocket 12 of the outer shell 1 and a rear hook member 15 arranged in the rear pocket 13 of the outer shell 1. The front and rear hook members 14,15 may be attached to a backsheet of the absorbent assembly (not shown), such as for example a nonwoven/film layer backsheet. The front and rear hook members 14,15 may alternatively be attached to a respective loop material zone provided on the backsheet of the absorbent assembly.

The outer shell 1 is provided with a first hook cover member 11a, arranged on the outer surface 4 and in the first corner region 7a and a second hook cover member 11b, arranged on the outer surface 4 and in the second corner region 7b of the outer shell 1, as shown in FIG. 1B. The first and second hook cover members 11a,11b are in the form of a respective first and second pocket. The first cover member 11a is provided with a first elastic member 16a arranged at an outer edge of the first hook cover member 11a, the second hook cover member 11b is provided with a second elastic member 16b arranged at an outer edge of the second hook cover member 11b. The first and second hook cover members 11a,11b are each provided in a first mode, in which the first and second hook cover members 11a,11b do not cover the first and second hook members 9a,9b. The first hook cover member 11a is attached to the outer shell 1 along a first corner outer edge 7a' and the second hook cover member is attached to the outer shell 1 along a second corner outer edge 7b'.

Figure 2A:
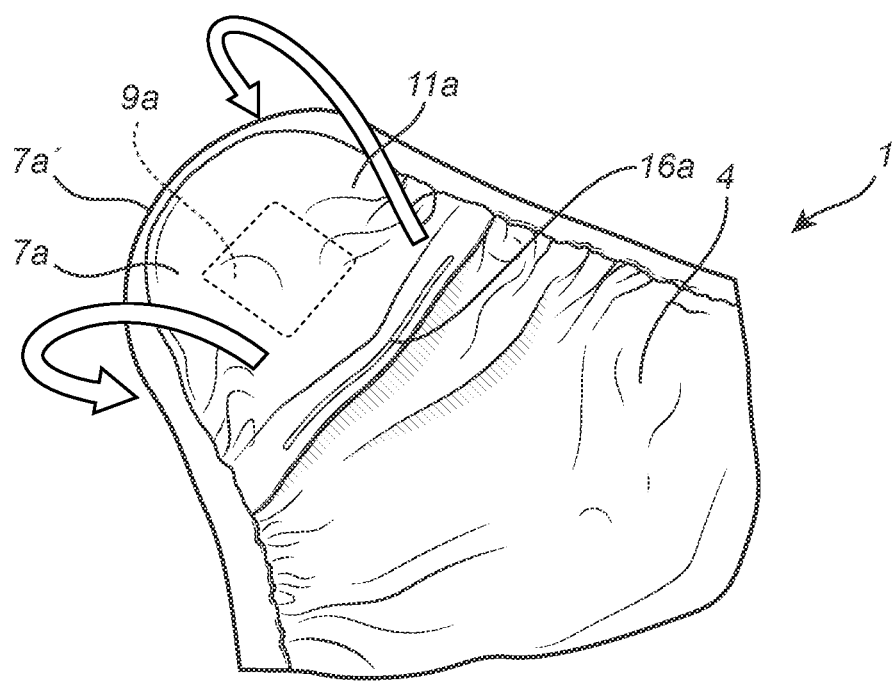
FIG. 2A illustrates the hook cover member according to the present disclosure provided in the first mode.
Figure 2B:
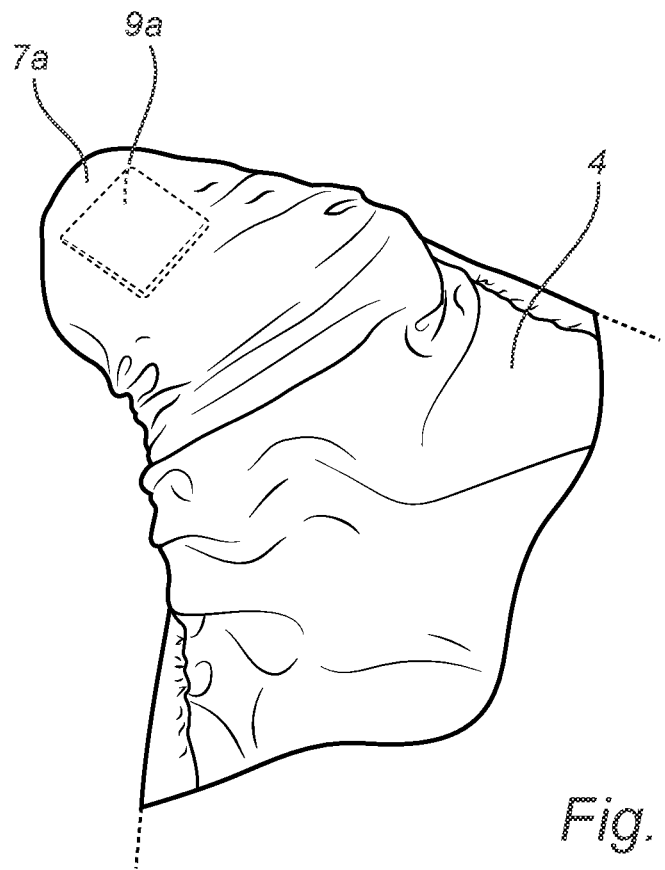
FIG. 2B illustrates the hook cover member according to the present disclosure provided in the second mode.

FIG. 2A illustrates the first corner region 7a of the outer shell 1 shown in FIG. 1B, as seen from the outer surface 4 of the outer shell. The first hook cover member 11a is provided in the first mode and is a first pocket arranged on the outer surface 4 of the outer shell 1. The first hook cover member 11a is attached to the outer shell 1 along the first corner outer edge 7a' of the outer shell 1. The first hook cover member 11a comprises the elastic member 16a. After use and prior to washing of the washable outer shell 1, the first hook cover member 11a may be folded inwardly and over the first corner outer edge 7a' as illustrated by the arrows in FIG. 2A, to a second mode of the first hook cover member 11a, wherein the hook cover member 11a covers the first hook member 11a, as illustrated in FIG. 2B.

In FIG. 3, the outer shell 1 shown in FIG. 1A is illustrated with an absorbent assembly 2 attached thereto and extending from the front portion 5, over the crotch portion 6 and to the rear portion 7 of the outer shell 1. The outer shell 1 has the front pocket 12 arranged in the front region 5 of the outer shell 1 and receiving a front section 2a of the absorbent assembly 2 and the rear pocket 13 arranged in the rear region 7 of the outer shell and receiving a rear section 2b of the absorbent assembly 2. The front pocket 12 extends from a front edge 1a of the outer shell 1 and over a first and second front edge corner regions 5a,5b of the outer shell 1. The rear pocket extends from a rear edge 1c of the outer shell 1 and over the first corner region 7a, the second corner region 7a and a rear central region 7c arranged between the first and the second corner regions 7a,7b. The first hook member 7a is arranged on the rear pocket 13 in the first corner region 7a and the second hook member 7b is arranged on the rear pocket 13 in the second corner region 7b, the rear pocket 13 forming a part of the inner surface 3 of the outer shell 1.

The invention claimed is:

1. A washable outer shell for an absorbent assembly, the outer shell comprising an inner surface and an outer surface opposite to the inner surface, the outer shell has an extension in the longitudinal direction and in the transverse direction, the outer shell comprises a front region, a crotch region and a rear region, the rear region comprising a first and a second corner region and a rear central region arranged between the first and the second corner regions, as seen in the transverse direction, the outer shell comprising a first hook member provided in the first corner region on the inner surface of the outer shell and a second hook member provided in the second corner region on the inner surface of the outer shell, the first corner region comprising a first corner outer edge and the second corner region comprising a second corner outer edge, the outer shell comprising a hook attachment zone on the outer surface in the front region of the outer shell, the first and second hook members being adapted to be attached to the hook attachment zone to form a waist opening, wherein each of the first corner region and the second corner region is provided with a respective first and second hook cover member, each hook cover member having a first mode in which the respective hook cover member is arranged to expose the respective first and second hook member and a second mode covering the respective hook member, each of the respective hook cover members has a free edge and an attached edge, wherein the attached edge is attached to the respective corner outer edge of the respective corner region, and each of the respective hook cover members has an elastic member extending along the respective free edge, wherein each of the first and the second hook cover member is arranged on the outer surface of the outer shell when in the first mode, and wherein each of the first and the second hook cover member is folded over the respective first and a second corner outer edge and arranged on the inner surface of the outer shell when in the second mode.

2. The washable outer shell according to claim 1, wherein each of the first and second hook member is arranged 15 mm or less from the respective first and second corner outer edge.

3. The washable outer shell according to claim 1, wherein the first and the second hook cover member are a respective first and second pocket arranged on the outer surface of the outer shell when in the first mode and are adapted to be folded over to the inner surface of the outer shell at the respective first and a second corner outer edge when in the second mode.

4. The washable outer shell according to claim 3, wherein the first pocket is attached along the first corner outer edge of the outer shell and the second pocket is attached along the second corner outer edge of the outer shell.

5. The washable outer shell according to claim 1, wherein a surface area of the first hook cover member is at least 20% larger than a surface area of the first hook member and a surface area of the second hook cover member is at least 20% larger than a surface area of the second hook member.

6. The washable outer shell according to claim 1, wherein the first and second hook cover member is made of the same material as the outer shell.

7. The washable outer shell according to claim 1, wherein the outer shell is made of one or more of the following materials; polyester, viscose, polyamide and/or cotton.

8. The washable outer shell according to claim 1, wherein the first and second hook cover members are integrated parts of the outer shell.

9. The washable outer shell according to claim 1, wherein the first and second hook cover members are separate parts connected to the outer shell.

10. The washable outer shell according to claim 1, wherein the first and second hook members each has a rectangular shape, or a trapezoid shape, with rounded corner portions.

11. The washable outer shell according to claim 1, wherein the outer shell comprises a front pocket arranged in the front region of the outer shell on the inner surface of the outer shell and a rear pocket arranged on the inner surface of the outer shell in the rear region of the outer shell, the front and rear pockets being adapted to receive a front section and a rear section of the absorbent assembly to hold the absorbent assembly in the outer shell.

12. The washable outer shell according to claim 11, wherein the washable outer shell comprises a front hook member arranged on the inner surface of the outer shell and in the front pocket and rear hook member arranged on the inner surface of the outer shell in the rear pocket.

* * * * *